United States Patent
Didier

Patent Number: 5,905,456
Date of Patent: May 18, 1999

[54] METHOD OF EVALUATING NON-EUCLIDEAN EFFECTS AFFECTING AN IMAGE ACQUIRED BY A SPACE RADAR AND A SATELLITE FOR IMPLEMENTING THE METHOD

[75] Inventor: Massonnet Didier, Saint Orens-De-Game-Ville, France

[73] Assignee: Centre National D'Etudes Spatiales, Paris, France

[21] Appl. No.: 08/817,138

[22] PCT Filed: Oct. 12, 1995

[86] PCT No.: PCT/FR95/01332

§ 371 Date: Apr. 9, 1997

§ 102(e) Date: Apr. 9, 1997

[87] PCT Pub. No.: WO96/12201

PCT Pub. Date: Apr. 25, 1996

[30] Foreign Application Priority Data

Oct. 13, 1994 [FR] France .................................. 94 12220

[51] Int. Cl.⁶ ...................................................... G01S 13/90
[52] U.S. Cl. .............................................................. 342/25
[58] Field of Search ........................................ 342/25, 179

[56] References Cited

U.S. PATENT DOCUMENTS

5,332,999 7/1994 Prati et al. ................................. 342/25
5,726,656 3/1998 Frankot ..................................... 342/25

*Primary Examiner*—Daniel T. Pihulic
*Attorney, Agent, or Firm*—Pollock, Vande Sande & Amernick

[57] ABSTRACT

A method of evaluating the phase shift associated with a wave emitted by a space radar propagating through the ionosphere. The method comprises the steps of forming first and second interferograms from pairs of radar images obtained by using two respective space radars operating at respective wavelengths $\lambda_1$ and $\lambda_2$ satisfying the relationship $m\lambda_1 = n\lambda_2$ where m and n are integers, the radars being placed on the same satellite; and performing the linear combination $n\phi_1 - m\phi_2$ of respective phases $\phi_1 - \phi_2$ of the first and second interferograms, with the fractional portion of the linear combination being representative of the non-Euclidean effects affecting the images of the space radars used in making the interferograms.

4 Claims, 1 Drawing Sheet

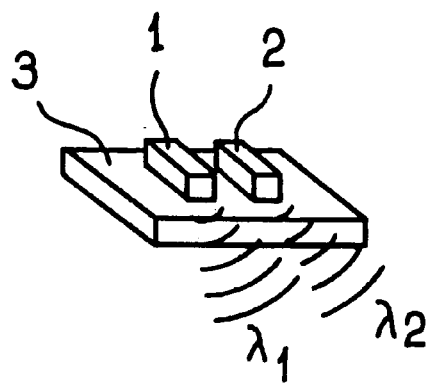
FIG_1
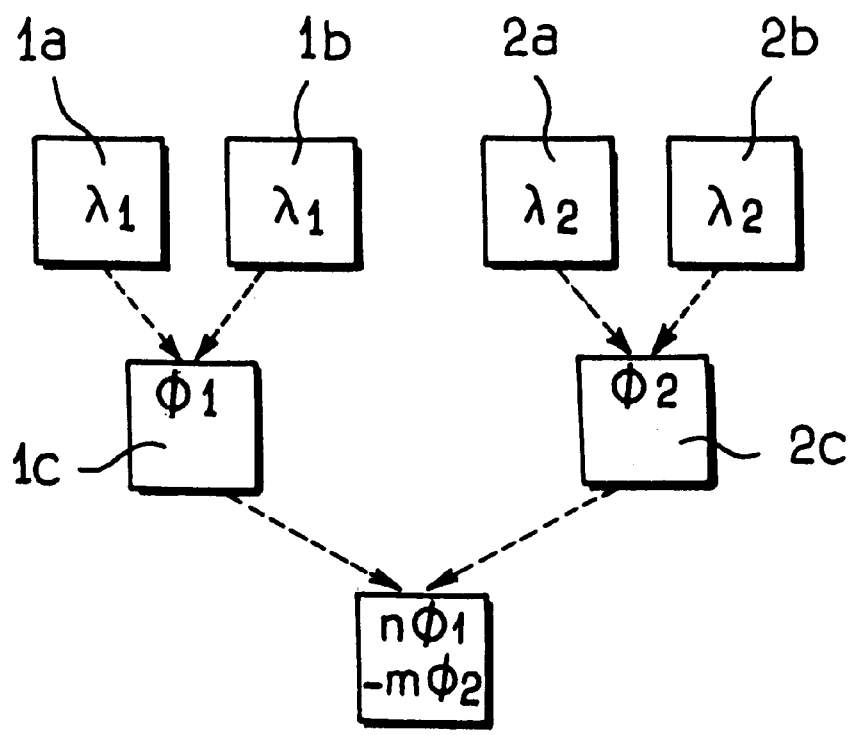
FIG_2

METHOD OF EVALUATING NON-EUCLIDEAN EFFECTS AFFECTING AN IMAGE ACQUIRED BY A SPACE RADAR AND A SATELLITE FOR IMPLEMENTING THE METHOD

FIELD OF THE INVENTION

The present invention relates to the field of observation satellite imaging, and more particularly space radar imaging.

BACKGROUND OF THE INVENTION

Space radar imaging is different from optical imaging, which is well known, and which relies on physical principles close to those of human vision. The image acquired by a space radar differs firstly in that its contents differs from that obtained by means of a conventional optical system since the scene is observed by the space radar at a decimeter wavelength (3 cm to 25 cm) which is much greater than the micrometer wavelength used in traditional optics. The image also differs in the way in which it is acquired, since a space radar is an active instrument which includes its own source for illuminating the scene, thereby making observation possible by night as well as by day, and by an appropriate choice of wavelength, making observation insensitive to cloud. It therefore provides "all-weather" imaging which gives numerous operational advantages. However, since it is difficult to deploy antennas that are more than 10 meters long in space, the natural angular resolution of space radars is very poor, being of the order of half a degree (whereas the human eye is about ten times better). Radar imaging therefore does not rely on the natural resolution of the instrument. Resolution in the direction perpendicular to the flight direction is obtained by analysis on board the satellite of echo return times (the principle on which all radars are based), and in the direction parallel to the flight direction, by a digital process known as "aperture synthesis", which process is performed on the ground and requires large amounts of computation. Each of the lines of a radar "image" corresponds to a pulse emitted by the radar and transformed into a run of samples ordered by their return times giving column indices for the image. The samples are complex numbers representative of the amplitude and of the phase of the reflected wave. The above-mentioned digital process of aperture synthesis conserves the complex nature of the signals processed, such that, in addition to its main operational quality, i.e., that of being insensitive to cloud and being capable of operating at night, a space radar installed on a satellite makes it possible to measure small displacements by means of the technique of interferometry.

The phase of the reflected wave contains information concerning the position, the distribution, and the radioelectric nature of elements constituting the scene illuminated by the radar, also known as "targets" (such as pebbles, branches, etc.). By comparing radar images taken at different dates and under almost identical conditions, position information can be isolated from other information by constructing an interferogram. Radar interferometry was proposed and tested more than 20 years ago, and reference may usefully be made to the article published by L. C. Graham in IEEE Proceedings, Vol. 62, No. 6, Jun. 1974, entitled "Synthetic interferometer radar for topographic mapping".

Phase information is influenced by three factors, of which the first two are unknown:

the phase shift caused by reflection of the radar wave on targets, and associated with the electromagnetic properties of the targets;

the phase shift associated with the relative positions of the targets within a common image element or "pixel". The resultant phase of a pixel is the result of a complex combination of the contributions from the various targets present within the pixel, and weighted by their respective amplitudes; and the phase shift that may possibly be due to targets moving or to a change of observation conditions.

When implementing radar interferometry techniques, it is assumed that the first two factors, although unknown, are stable over time. For the first factor, this assumption implies that the targets are physically stable, and for the second factor, it implies geometrical stability restraining possible variation in the angle of incidence of the radar between two passes of the satellite. Thus, the surface state of the ground must not change excessively between acquiring two images (which rules out the surface of the sea, for example), and the satellite must follows its earlier trajectory very closely (to within a few hundreds of meters at most).

If the above assumption is true, then changes of phase due to the third factor between two radar images can be obtained by constructing an interferogram which represents differences in phase between the two images. These differences can be considered as being the result of four contributions:

the trajectories of the satellite becoming orbitally closer or more distant between acquiring images. As mentioned above, the orbits must be close but they are never identical, nor even parallel in practice;

a stereoscopic effect produced by the topography when observed from two viewpoints that are slightly different;

overall movement of the target as a whole that has taken place between acquiring the images; and variations in atmospheric propagation length and variations in phase due to the ionosphere. These are also known as "non-Euclidean" effects since the phase variations to which various wavelengths are subjected cannot be explained by a common increase or decrease in optical path length.

In practice, it is difficult to evaluate separately the contribution of each of the factors that has an influence on phase.

Nevertheless, the following considerations can be of some help:

an effect due to the ground moving must appear on all interferograms covering a given time interval, whatever the orbital differences between pictures being taken. For example, if the ground appears to have moved in an interferogram constructed from images acquired in April and in May, then it must also be present in an interferogram constructed from images acquired in March and in June; and an effect due to atmospheric propagation must be found in all of the interferograms containing contributions from any particular image that has been effected by this propagation effect.

Non-Euclidean effects can be evaluated by deduction after quantifying the other factors that affect phase. This quantification is nevertheless made difficult by the fact that distance measurement is ambiguous, since it is only given modulo the wavelength λ of the radar. In other words, if the wavelength is 5 cm, a 2 cm displacement looks the same as a 7 cm displacement. Complete measurement can be built up by "unwrapping" phase over the image from one point to another so as to show up integer numbers of wavelengths missing from the measurement. Reference may usefully be made to the article entitled "Satellite radar interferometry: two-dimensional phase unwrapping" by Goldstein et al., published in Radio Science, Vol. 23, No. 4, pp. 713 to 720, July–August 1988. Nevertheless, the phase unwrapping operation is difficult to automate and, to the knowledge of the Applicant, there exists no method that makes it possible to evaluate non-Euclidean effects easily and accurately.

SUMMARY OF THE INVENTION

An object of the present invention is thus to propose an imaging method that makes it possible to evaluate non-Euclidean effects, in particular without it being necessary to "unwrap" phase in order to do this.

The method of the invention comprises the steps consisting in:

forming first and second interferograms from pairs of radar images obtained by using two respective space radars operating at respective wavelengths $\lambda_1$ and $\lambda_2$ satisfying the relationship $m\lambda_1=n\lambda_2$ where m and n are integers, these radars being placed on the same satellite; and performing the linear combination $n\phi_1-m\phi_2$ of respective phases $\phi_1$ and $\phi_2$ of the first and second interferograms, with the fractional portion of these linear combination being representative of the non-Euclidean effects affecting the images of these space radars used in making the interferograms. Most preferably, m=2 or m=3, and n=1.

The invention also provides a satellite for implementing the method, fitted with two radars suitable for operating at respective wavelengths of $\lambda_1$ and $\lambda_2$.

The invention also provides a representation of non-linear effects obtained by implementing the above method.

BRIEF DESCRIPTION OF THE DRAWINGS

The invention will be better understood on reading the following description and on examining the accompanying drawing, in which:

FIG. 1 is a schematic view of an observation satellite platform fitted with two space radars of the invention; and FIG. 2 is a highly schematic illustration of how images coming from each of the radars on the satellite are processed.

DETAILED DESCRIPTION

FIG. 1 shows two aperture synthesis space radars 1 and 2 that are known per se and not described in detail, both being mounted on a common platform 3 of an earth observation satellite.

The two radars 1 and 2 are designed to operate at respective wavelengths $\lambda_1$ and $\lambda_2$ satisfying the relationship $m\lambda_1=n\lambda_2$ where m and n are integers.

Each radar is used to form a pair of radar images referenced 1a and 1b for the first radar and 2a and 2b for the second radar, from which two respective interferograms 1c and 2c are constructed in conventional manner. The images 1a and 2a are obtained simultaneously, as are the images 1b and 2b.

For the same geometrical path length difference D on the interferograms 1c and 2c, the following relationships apply:

$$D+E(\lambda_1)=k_1\lambda_1+\lambda_1\phi_1 \qquad (1)$$

$$D+E(\lambda_2)=k_2\lambda_2+\lambda_2\phi_2 \qquad (2)$$

$$m\lambda_1=n\lambda_2 \qquad (3)$$

where $k_1$ and $k_2$ are integers, $\phi_1$ and $\phi_2$ are the phases respectively measured on the interferograms 1c and 2c, and $E(\lambda_1)$ and $E(\lambda_2)$ represent the non-Euclidean effects affecting the propagation of the radar waves at wavelengths $\lambda_1$ and $\lambda_2$, and that are to be evaluated.

Equations (1) and (2) can also be written as follows:

$$D=k_1\lambda_1+\lambda_1[\phi_1-E(\lambda_1)/\lambda_1] \qquad (4)$$

$$D=k_2\lambda_2+\lambda_2[\phi_2-E(\lambda_2)/\lambda_2] \qquad (5)$$

By performing (4)–(5), $$k_2\lambda_2-k_1\lambda_1=\lambda_1[\phi_1-E(\lambda_1)/\lambda_1]-\lambda_2[\phi_2-E(\lambda_2)/\lambda_2] \qquad (6)$$

By combining (3) and (6)

$$[mk_2-nk_1]\lambda_1=n\lambda_1[\phi_1-E(\lambda_1)/\lambda_1]-m\lambda_1[\phi_2-E(\lambda_2)/\lambda_2] \qquad (7)$$

Taking the fractional portion of (7)

$$\mathrm{frac}(n\phi_1-m\phi_2)=\mathrm{frac}(mE(\lambda_2)/\lambda_2-nE(\lambda_1)/\lambda_1)$$

Knowing $\phi_1$ and $\phi_2$ from reading the interferograms 1c and 2c, it is possible to map the non-Euclidean effects as the value of the fractional portion of:

$$mE(\lambda_2)/\lambda_2-nE(\lambda_1)/\lambda_1.$$

The values of m and n are preferably limited to 2 or 3 at most because of the contribution of noise in the interferograms that have been multiplied and combined increases as $(m^2+n^2)^{1/2}$.

Finally, by using two radars mounted on the same satellite platform and by operating at wavelengths in a simple integer or fractional ratio, the invention makes it possible to separate easily non-Euclidean effects from other effects that affect phase, it being easy for the person skilled in the art to multiply phase by an integer.

It is thus possible, by linear combinations of interferograms and without it being necessary to "unwrap" phase:

to map propagation effects that originate in the ionosphere; and to produce interferograms from which such effects have been removed.

The invention is thus suitable for measuring small movements of the ground, in particular for:

measuring co-seismic displacements, and looking for pre- or post-seismic displacements;

detecting the swelling of volcanos prior to eruption;

measuring landslides;

measuring the rate of advance of glaciers;

monitoring the settling of off-shore platforms;

monitoring ground subsidence due to mining, gas extraction, oil extraction, or underground nuclear testing; and classifying crops by directly measuring the rate of plant growth.

I claim:

1. A method of evaluating the non-Euclidean effects that affect an image obtained with a space radar, namely, the phase shift due to the wave emitted by said radar propagating through the ionosphere, said method comprising the steps of:

(a) forming first and second interferograms from pairs of radar images obtained by using two respective space radars operating at respective wavelengths $\lambda_1$ and $\lambda_2$ satisfying the relationship $m\lambda_1=m\lambda_2$ where m and n are integers, said radars being placed on a same satellite; and (b) performing a linear combination $n\phi_1 - m\phi_2$ of respective phases $\phi_1$ and $\phi_2$ of said first and second interferograms, with a fractional portion of said linear combination being representative of non-Euclidean effects affecting the images of said space radars used in making the interferograms.

2. The method according to claim 1, wherein m is selected from the set and n=1.

3. A satellite for implementing a method of evaluating non-Euclidean effects that affect an image obtained with a space radar, said satellite being fitted with two space radars suitable for operating respectively at the wavelengths $\lambda_1$ and $\lambda_2$ and providing pairs of radar images, means for forming first and second interferograms from said pairs of radar images, and means for performing a linear combination of respective phases of the first and second interferograms.

4. The satellite according to claim 3, wherein the space radars are aperture synthesis radars.

* * * * *

UNITED STATES PATENT AND TRADEMARK OFFICE
CERTIFICATE OF CORRECTION

PATENT NO. : 5,905,456
DATED : May 18, 1999
INVENTOR(S): Didier Massonnet

It is certified that error appears in the above-identified patent and that said Letters Patent is hereby corrected as shown below:

Column 5,
 line 8, after "set" insert --[2:3]--.

Signed and Sealed this

Twenty-first Day of September, 1999

Attest:

Q. TODD DICKINSON

*Attesting Officer*   Acting Commissioner of Patents and Trademarks